(12) United States Patent
Schramowski et al.

(10) Patent No.: US 11,976,751 B2
(45) Date of Patent: *May 7, 2024

(54) MULTILAYER MOTOR VEHICLE PIPELINE

(71) Applicant: TI Automotive (Fuldabrück) GmbH, Fuldabrück (DE)

(72) Inventors: Martin Schramowski, Kassel (DE); Andre Häckel, Waldeck (DE)

(73) Assignee: TI Automotive (Fuldabrück) GmbH, Fuldabrück (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,879

(22) Filed: Mar. 3, 2023

(65) Prior Publication Data
US 2023/0204134 A1 Jun. 29, 2023

Related U.S. Application Data

(63) Continuation of application No. 17/194,203, filed on Mar. 5, 2021, now Pat. No. 11,655,920.

(30) Foreign Application Priority Data

Mar. 6, 2020 (EP) .................... 20161376

(51) Int. Cl.
*F16L 11/12* (2006.01)
*F16L 11/04* (2006.01)

(52) U.S. Cl.
CPC ......... *F16L 11/12* (2013.01); *F16L 2011/047* (2013.01)

(58) Field of Classification Search
CPC ........................... F16L 11/12; F16L 2011/047
(Continued)

(56) References Cited

U.S. PATENT DOCUMENTS 5,167,259 A * 12/1992 Brunnhofer ............... B32B 1/08
138/140
5,186,987 A * 2/1993 Imoto ................. F16L 55/1656
264/269

(Continued)

FOREIGN PATENT DOCUMENTS

| CN | 1300250 A | 6/2001 |
|---|---|---|
| CN | 1406739 A | 4/2003 |

(Continued)

OTHER PUBLICATIONS

Elastron Engineering Life, TPE Products, Copyright 2022 Elastron TPE, 5 pages.

*Primary Examiner* — David R Deal
(74) *Attorney, Agent, or Firm* — Dickinson Wright PLLC

(57) ABSTRACT

Multilayer motor vehicle tube for conducting at least one fluid medium, wherein the tube comprises a fluid duct and a tube wall that surrounds the fluid duct. The tube wall is multilayered and comprises at least three layers, specifically having the following layer composition. An external layer is provided that consists of at least one polyamide, in particular of at least one aliphatic polyamide. Furthermore, an adhesion-promoting layer is provided and an internal layer consisting of at least one thermoplastic elastomer. At least one barrier layer is also provided that consists of at least 96% by weight of polypropylene. The overall layer thickness d of the tube wall is from 0.3 to 3.0 mm.

20 Claims, 2 Drawing Sheets

(58) Field of Classification Search
USPC .......................................................... 138/137
See application file for complete search history.

(56) References Cited

U.S. PATENT DOCUMENTS

| | | | |
|---|---|---|---|
| 5,472,754 A * | 12/1995 | Douchet | F16L 11/127 428/476.3 |
| 5,622,210 A * | 4/1997 | Crisman | F16L 11/115 138/104 |
| 6,089,278 A | 7/2000 | Nishino et al. | |
| 6,576,342 B1 | 6/2003 | Cerf | |
| 8,541,082 B2 | 9/2013 | Inaba | |
| 11,655,920 B2 * | 5/2023 | Schramowski | B32B 27/34 138/137 |
| 2002/0036020 A1 | 3/2002 | Noone et al. | |
| 2002/0056482 A1 * | 5/2002 | Katayama | F16L 11/112 138/143 |
| 2002/0179170 A1 | 12/2002 | Guippe et al. | |
| 2003/0098085 A1 | 5/2003 | Ito et al. | |
| 2003/0124289 A1 | 7/2003 | Yamamoto | |
| 2004/0040607 A1 | 3/2004 | Wilson et al. | |
| 2004/0040608 A1 | 3/2004 | Ito et al. | |
| 2005/0087249 A1 * | 4/2005 | Izumi | F16L 9/123 138/121 |
| 2006/0083883 A1 | 4/2006 | Shinoda et al. | |
| 2007/0148388 A1 | 6/2007 | Kuhmann et al. | |
| 2007/0193643 A1 * | 8/2007 | Jarvenkyla | F16L 9/147 138/140 |
| 2008/0041484 A1 | 2/2008 | Haines | |
| 2011/0220236 A1 | 9/2011 | Kettl et al. | |
| 2012/0021157 A1 | 1/2012 | Kawai et al. | |
| 2013/0061974 A1 * | 3/2013 | Oyaizu | B32B 25/08 138/126 |
| 2019/0285203 A1 | 9/2019 | Zimmer et al. | |

FOREIGN PATENT DOCUMENTS

| | | |
|---|---|---|
| CN | 1488495 A | 4/2004 |
| CN | 104139681 A | 11/2014 |
| CN | 110001173 A | 7/2019 |
| DE | 102004036179 A1 | 3/2006 |
| DE | 20321380 U1 | 1/2007 |
| DE | 102018213140 A1 | 2/2020 |
| EP | 3482987 A1 | 5/2019 |
| EP | 3530453 A1 | 8/2019 |
| EP | 3530454 A1 | 8/2019 |
| EP | 3613578 A1 | 2/2020 |
| FR | 2817320 A1 | 5/2002 |
| JP | 2004176906 A | 6/2004 |
| JP | 2006118392 A | 5/2006 |
| JP | 2008044375 A | 2/2008 |
| JP | 2008507436 A | 3/2008 |

* cited by examiner

MULTILAYER MOTOR VEHICLE PIPELINE

RELATED APPLICATIONS

The present disclosure is a continuation application of U.S. patent application Ser. No. 17/194,203 filed on Mar. 5, 2021, which is a national phase application of European Application 20161376.7, filed on Mar. 6, 2020, the entire contents of each of which are incorporated herein by reference.

FIELD

The present disclosure relates to a multilayer motor vehicle pipeline (i.e. a multilayer tube) for conducting at least one fluid medium, wherein the tube comprises a fluid duct and a tube wall that surrounds the fluid duct, the tube wall being multilayered and comprising three layers.

BACKGROUND

In principle, different embodiments of multilayer motor vehicle tubes and temperature-control tubes or cooling tubes are known from practice. It is also known to use such multilayer tubes in temperature-control circuits of motor vehicles. However, it has been found that the tubes known thus far have a number of disadvantages. The tubes often leave a lot to be desired in terms of their barrier properties and/or in terms of their mechanical stability or resistance. If a compromise is intended to be reached between sufficient barrier properties and high mechanical stability of the tube, this is often only possible by means of a high amount of manufacturing effort or high material costs. Furthermore, when used in different temperature-control circuits, for example in a motor vehicle air-conditioning system or in a temperature-control system in hybrid or electric vehicles, the temperature-control tubes have to meet various requirements. In practice, this means that different tubes have to be used for the different fields of application. In this respect, there is a need for improvement.

In contrast, the technical problem of the disclosure is to provide a motor vehicle tube of the type mentioned at the outset, which satisfies all requirements in terms of its barrier properties and its mechanical stability and which can still be produced with low manufacturing costs and can be used quasi universally or flexibly in temperature-control circuits, for example in coolant circuits of motor vehicles.

BRIEF SUMMARY

The pipeline or tube according to the disclosure is preferably used as a temperature-control tube in temperature-control circuits of motor vehicles. In this case, a fluid temperature-control medium, for example a liquid or gaseous temperature-control medium, is guided through the tube. The tube according to the disclosure is therefore preferably a temperature-control tube. A particularly preferred embodiment of the motor vehicle tube according to the disclosure is characterized in that the tube is used as a cooling tube in a temperature-control circuit or a cooling circuit of a motor vehicle. If the tube is used as a cooling tube, a cooling medium—in particular a liquid cooling medium—of a cooling circuit of the motor vehicle is conducted through the cooling tube. The multilayer tubes according to the disclosure can be used as temperature-control tubes or cooling tubes in air-conditioning systems in motor vehicles, for example. Furthermore, the tube is used in temperature-control circuits of electric vehicles or hybrid motor vehicles where they are preferably used for controlling the temperature of the battery systems or for cooling them.

In order to solve the above-noted technical problem, the disclosure teaches a multilayer motor vehicle tube for conducting at least one fluid medium, the tube comprising a fluid duct and a tube wall that surrounds the fluid duct, the tube wall being multilayered and comprising at least three layers, specifically having the following layer composition from the outside in:
- an external layer consisting of at least one polyamide, in particular of at least one aliphatic polyamide,
- an adhesion-promoting layer,
- an internal layer consisting of at least one thermoplastic elastomer,
- the overall layer thickness d of the tube wall accounting for from 0.3 to 3.0 mm, preferably from 0.5 to 2.5 mm, and preferably from 0.75 to 2.0 mm.

The disclosure relates to a multilayer motor vehicle tube or the use thereof as a temperature-control tube in motor vehicles. In this case, a fluid temperature-control medium, in particular a liquid temperature-control medium and preferably a liquid cooling medium, is guided through the tube. The motor vehicle tube according to the disclosure can be used as a temperature-control tube, in particular as a cooling tube, in a temperature-control circuit or cooling circuit of a motor vehicle. The multilayer motor vehicle tube according to the disclosure is therefore preferably a temperature-control tube and in particular a cooling tube. According to a recommended embodiment of the disclosure, the tube according to the disclosure is used in a temperature-control circuit for controlling the temperature of the battery system of an electric vehicle or a hybrid vehicle or for cooling it. Within the context of the disclosure, the tube according to the disclosure is also used as a temperature-control tube or a cooling tube in an air-conditioning system of a motor vehicle. It is advisable to use an alcohol/water mixture as the temperature-control medium or cooling medium, preferably a glycol/water mixture. Within the context of the disclosure, however, other temperature-control media or cooling media can also be used.

The disclosure is based on the understanding that the multilayer motor vehicle tube according to the disclosure satisfies all requirements in terms of its barrier properties and its mechanical stability, and at the same time can be produced with a small amount or reduced amount of manufacturing effort. Furthermore, the multilayer motor vehicle tube according to the disclosure can be flexibly or universally used as a temperature-control tube or cooling tube in temperature-control circuits or cooling circuits in motor vehicles on account of its advantageous properties. In this connection, a particular advantage of the tube according to the disclosure is that it can be used both in temperature-control circuits or cooling circuits of air-conditioning systems and in temperature-control circuits or cooling circuits for battery systems in electric and/or hybrid vehicles on account of its specific layered composite.

The overall layer thickness d of the tube wall according to the disclosure that is in the range of from 0.3 to 3.0 mm, preferably from 0.5 to 2.5 mm and preferably from 0.75 to 2.0 mm, has proven to be particularly successful in terms of solving the technical problem.

One form of the disclosure is characterized in that the external layer consists, or substantially consists, of at least one polyamide selected from the group "Nylon 6, Nylon 10, Nylon 11, Nylon 12," preferably of Nylon 6. The external layer can also comprise additives in addition to the at least one polyamide. It is recommended that the external layer consists of up to at least 90 wt. %, preferably of up to at least 93 wt. %, preferably of up to at least 97 wt. %, of at least one polyamide selected from the above-mentioned group, preferably of Nylon 6.

According to the disclosure, an internal layer consisting of at least one thermoplastic elastomer is provided. Within the context of the disclosure here, the thermoplastic elastomer is based on at least one component selected from the group of: "ethylene propylene diene rubber (EPDM), butyl rubber, chlorobutyl rubber, styrene-butadiene rubber, nitrile rubber, nitrile butadiene rubber." According to a particular recommended embodiment, the thermoplastic elastomer is based on ethylene propylene diene rubber (EPDM). Within the context of the disclosure, the internal layer consists or substantially consists of the at least one thermoplastic elastomer. The internal layer expediently consists of up to at least 90 wt. %, preferably of up to at least 93 wt. %, preferably of up to at least 97 wt. %, of the thermoplastic elastomer. The internal layer can comprise additives in addition to the at least one thermoplastic elastomer.

EPDM has proven to be particularly successful as a component for the thermoplastic elastomer of the internal layer of the tube according to the disclosure and in particular leads to very advantageous properties of the tube in terms of its mechanical stability. According to one embodiment of the motor vehicle tube according to the disclosure, the internal layer consists or substantially consists of EPDM. Within the context of the disclosure, the thermoplastic elastomer of the internal layer is an olefin-based thermoplastic elastomer (TPO). Within the context of the disclosure, such a TPO elastomer expediently comprises EPDM and a polyolefin, preferably polypropylene. Particularly preferably, within the context of the disclosure, the thermoplastic elastomer of the internal layer is a thermoplastic vulcanizate (TPV). According to a recommended embodiment of the disclosure, a mixture or an alloy consisting of an elastomer or rubber and a polyolefin—in particular polypropylene—is then used as the thermoplastic vulcanizate (TPV) for the internal layer. The elastomer or rubber is preferably EPDM.

According to the disclosure, an adhesion-promoting layer is provided between the external layer and the internal layer. A highly recommended embodiment of the disclosure is characterized in that the adhesion-promoting layer is based on at least one polyolefin. It is very particularly preferable for the adhesion-promoting layer to be polypropylene-based.

The adhesion-promoting layer expediently consists or substantially consists of polypropylene. The adhesion-promoting layer can comprise additives in addition to the at least one polyolefin, preferably in addition to the polypropylene. It is recommended that the adhesion-promoting layer consists of up to at least 90 wt. %, preferably of up to at least 93 wt. %, preferably of up to at least 96 wt. %, and very preferably of up to at least 98 wt. %, of the polyolefin or polypropylene. Within the context of the disclosure, the adhesion-promoting layer in particular ensures that the layers surrounding it, for example the external layer and the internal layer, are connected in a functionally reliable manner to one another and prevents undesirable delamination of the layered composite when the tube is placed under mechanical strain. By means of the adhesion-promoting layer according to the disclosure, delamination can be avoided surprisingly simply and in a functionally reliable manner and is made possible by the adhesion-promoting layer, in particular with a small amount of manufacturing effort and low costs.

Another form of the disclosure is characterized in that the tube comprises an outer layer, which is connected to the external layer towards the outside. In such a variant, the external layer and the outer layer therefore preferably touch. Here, "towards the outside" means in the direction of the outside of the motor vehicle tube. The outer layer is expediently based on at least one polyamide, preferably based on at least one aliphatic polyamide, particularly preferably based on at least one polyamide selected from the group of: "Nylon 6/12, Nylon 6/6, Nylon 6/10, Nylon 6/16," and is very particularly preferably based on Nylon 6/12. Within the context of the disclosure, the outer layer consists or substantially consists of at least one polyamide and preferably consists or substantially consists of Nylon 6/12. The outer layer can also comprise additives in addition to the polyamide or the Nylon 6/12. According to recommendations, the outer layer consists of up to at least 90 wt. %, preferably of up to at least 93 wt. %, preferably of up to at least 96 wt. % and very preferably of up to at least 98 wt. % of at least one polyamide selected from the above-mentioned group or aliphatic polyamide and preferably of Nylon 6/12. It is advisable for the outer layer to be the end layer of the tube towards the outside. In principle, however, the scope of the disclosure also includes the fact that the tube according to the disclosure again comprises at least one outermost layer adjoining the outer layer towards the outside. According to a recommended embodiment, the layer thickness of the outer layer accounts for from 5% to 20%, preferably from 10% to 15%, of the overall layer thickness d of the tube wall.

According to another form of the disclosure, the tube comprises at least one barrier layer. The barrier layer is preferably based on at least one thermoplastic polymer. The barrier layer is particularly preferably based on at least one polyolefin and very particularly preferably based on polypropylene. Within the context of the disclosure, the barrier layer consists or substantially consists of the at least one polyolefin here. The barrier layer preferably consists of or substantially consists of polypropylene. The barrier layer can comprise additives in addition to the polyolefin or to the polypropylene. For example, these additives can be conductivity additives and therefore the barrier layer is preferably electrically conductive. It is expedient for the barrier layer to consist of up to at least 90 wt. %, preferably up to at least 93 wt. %, preferably up to at least 96 wt. %, and very preferably of up to at least 98 wt. % of the at least one polyolefin, preferably of polypropylene.

Polypropylene has been found to be particularly successful as the material for the at least one barrier layer, particularly with regard to its barrier properties. The embodiment of the tube according to the disclosure comprising a barrier layer made of polypropylene is also based on the understanding that especially advantageous barrier properties and simultaneously excellent mechanical stability of the tube can be achieved by the interaction between at least one polypropylene barrier layer and an internal layer made of at least one thermoplastic elastomer—in particular in combination with the rest of the layers of the tube.

It is preferable for the at least one barrier layer to form an inner layer of the tube, which is preferably connected to the internal layer towards the inside. Here, "towards the inside" means in the direction of the inside or the fluid duct of the motor vehicle tube. In such a variant, the internal layer and the barrier layer therefore preferably touch. If the barrier layer forms an inner layer of the tube, this inner layer is preferably the final layer of the tube towards the inside.

However, within the context of the disclosure, an innermost layer is also provided that adjoins the barrier layer or inner layer towards the inside.

According to an alternative variant of the disclosure, the at least one barrier layer is arranged between the internal layer and the outer layer. In such a variant, the internal layer preferably forms the final layer of the tube towards the inside. In principle, however, within the context of the disclosure an innermost layer of the tube is also provided that adjoins the internal layer towards the inside. In this variant, it is particularly preferable for the at least one barrier layer to be arranged between the internal layer and the external layer. Within the context of this particularly recommended embodiment, the barrier layer is preferably connected to the internal layer towards the outside and is very particularly preferably arranged between the internal layer and the adhesion-promoting layer.

According to a recommended embodiment of the disclosure, the layer thickness of the barrier layer accounts for from 10% to 60%, preferably from 15% to 50%, of the overall layer thickness d of the tube wall. The layer thickness of the external layer expediently accounts for from 10% to 40%, preferably from 10% to 20%, of the overall layer thickness d of the tube wall. It is recommended that the layer thickness of the adhesion-promoting layer accounts for from 2% to 15%, preferably from 7% to 15%, of the overall layer thickness d of the tube wall. Within the context of the disclosure, the layer thickness of the adhesion-promoting layer is between 0.025 and 0.45 mm, preferably between 0.035 and 0.35 mm, particularly preferably between 0.04 and 0.3 mm and very particularly preferably between 0.05 and 0.2 mm.

In accordance with the disclosure, the layer thickness of the internal layer accounts for from 5% to 20%, preferably from 7% to 15%, of the overall layer thickness d of the tube wall. The layer thickness of the outer layer and/or of the external layer and/or of the internal layer and/or of the barrier layer is preferably between 0.05 and 1.5 mm, preferably between 0.07 and 1.2 mm, particularly preferably between 0.1 and 0.8 mm, very particularly preferably between 0.1 and 0.5 mm.

A recommended embodiment of the disclosure is characterized in that the outer layer has a greater layer thickness than the adhesion-promoting layer. Within the context of the disclosure, the external layer and/or the internal layer and/or the barrier layer has/have a greater layer thickness than the adhesion-promoting layer.

It is preferable for the barrier layer to have a greater layer thickness than the internal layer.

According to a recommended embodiment of the motor vehicle tube, the internal layer or the barrier layer is in direct contact with a fluid guided in the fluid duct. The internal layer or the barrier layer therefore expediently forms the final layer of the tube towards the inside. Within the context of the disclosure, the final layer of the tube towards the inside comprises at least one conductivity addition such that this final layer of the tube towards the inside is preferably electrically conductive.

Furthermore, within the context of the disclosure the motor vehicle tube according to the disclosure is produced by means of extrusion or coextrusion of the layers.

According to a particularly preferred embodiment, the tube comprises at least five layers, preferably exactly five layers and specifically having the layer sequence from the outside in: outer layer consisting of polyamide, in particular Nylon 6/12/external layer consisting of polyamide, in particular Nylon 6/adhesion-promoting layer, in particular consisting of polypropylene/internal layer consisting of at least one thermoplastic elastomer, in particular based on EPDM/barrier layer, in particular of polypropylene. According to an alternative embodiment, the barrier layer is arranged between the adhesion-promoting layer and the internal layer such that a five-layer structure having the following layer composition from the outside in is formed: outer layer consisting of polyamide, in particular Nylon 6/12/external layer consisting of polyamide, in particular Nylon 6/adhesion-promoting layer, in particular consisting of polypropylene/barrier layer, in particular consisting of polypropylene/internal layer consisting of at least one thermoplastic elastomer, in particular based on EPDM. In principle, within the context of the disclosure the motor vehicle tube also comprises an innermost layer and an outermost layer such that the motor vehicle tube then comprises at least six layers or seven layers.

Within the context of the disclosure, at least regions, preferably all, of the motor vehicle tube is/are formed as a corrugated pipe. Here, a "corrugated pipe" means that the tube or the tube wall, in particular the outer surface of the tube or the tube wall, comprises wave crests and wave troughs, which run around the circumference of the tube. According to recommendations, these wave crests and wave troughs of the tube are equally or substantially equally spaced apart from one another over at least some of the length of the tube, preferably over the entire length or substantially over the entire length of the tube. An alternative variant is characterized in that the tube or the outer surface of the tube is preferably completely flat or substantially flat, at least in regions.

The disclosure is based on the understanding that the multilayer motor vehicle tube according to the disclosure has excellent properties in terms of its barrier properties and with regard to its mechanical stability or resistance. The tube therefore meets all requirements in terms of the barrier properties with respect to the fluid guided in the fluid duct, in particular the fluid temperature-control medium or fluid cooling medium, and also in terms of the mechanical stability. The tube or temperature-control tube is heat-resistant across a wide temperature range and the layers do not delaminate even under intense mechanical strain. Furthermore, the tube according to the disclosure displays an adequate degree of thermal insulation. Furthermore, the tube according to the disclosure can be used quasi universally or flexibly in temperature-control circuits or cooling circuits of motor vehicles due to its specific layer composition. Therefore, the tube according to the disclosure can be used as a temperature-control tube or cooling tube in air-conditioning systems and is simultaneously also suitable for use in temperature-control circuits in electric and/or hybrid motor vehicles, in particular for controlling the temperature of the battery systems, or cooling them. This flexible applicability of the motor vehicle tube according to the disclosure represents a significant advantage of the disclosure. The tube according to the disclosure can also be produced with a small amount of manufacturing effort and therefore low manufacturing costs. The preferred manufacture of the tube by means of coextrusion of the layered composite is possible in a problem-free, effective and energy-saving manner.

BRIEF DESCRIPTION OF THE DRAWINGS

The disclosure will be explained in more detail in the following on the basis of a set of drawings showing just one embodiment, in which.

DETAILED DESCRIPTION

Figure 1:
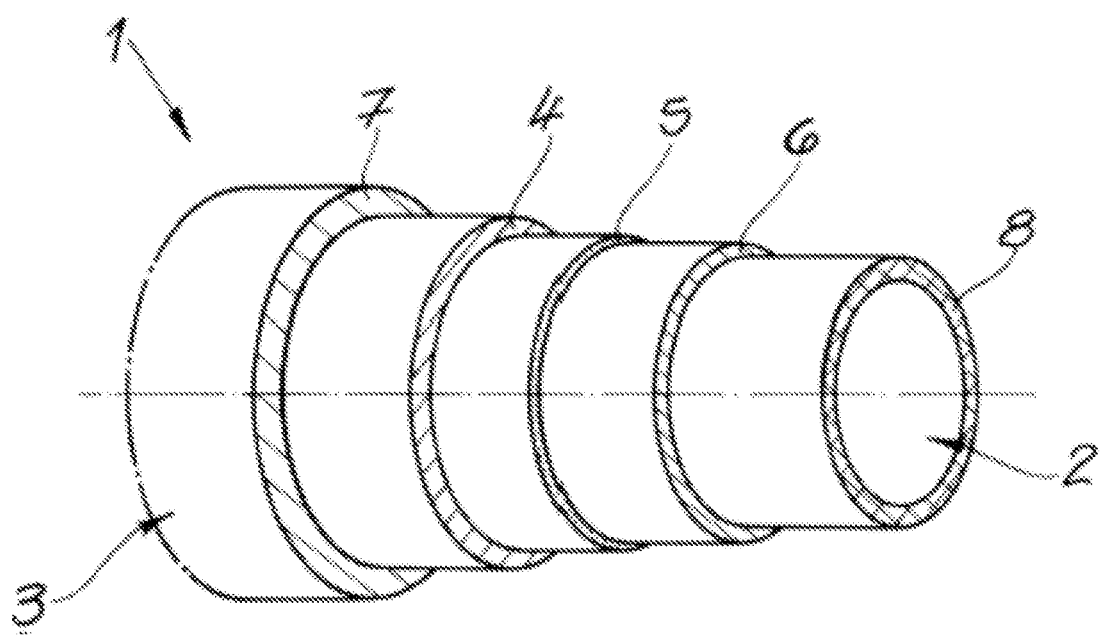
FIG. 1 is a schematic perspective view of a motor vehicle tube according to the disclosure.
Figure 2:
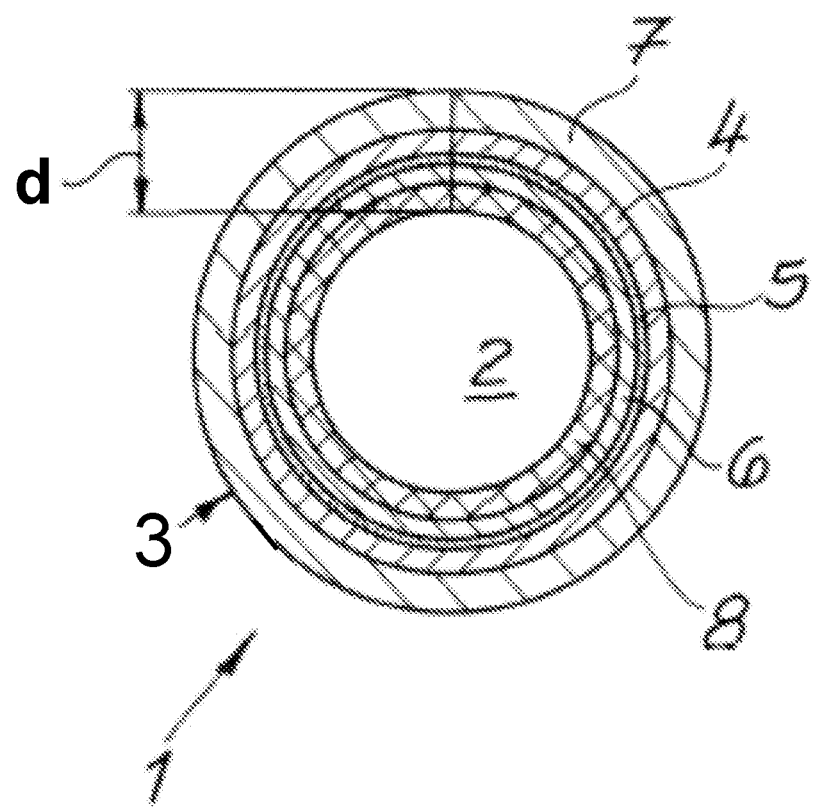
FIG. 2 is a schematic sectional view through the object according to FIG. 1.

The drawings show a multilayer motor vehicle tube 1 according to the disclosure. In the embodiment according to the drawings, this tube 1 may be a temperature-control tube, in particular a cooling tube for temperature-control circuits or cooling circuits in a motor vehicle. According to the disclosure, the tube 1 comprises a fluid duct 2 and a tube wall 3 that surrounds the fluid duct 2. By means of the tube 1, a fluid medium, in particular a fluid temperature-control medium or cooling medium that is not shown in more detail in the drawings, is guided in the fluid duct 2. According to recommendations and in the embodiment according to the drawings, the tube wall 3 is multilayered and comprises five layers. From the outside in, these five layers are an outer layer 7, an external layer 4, an adhesion-promoting layer 5, an internal layer 6 and a barrier layer 8. In this embodiment according to the drawings, the barrier layer 8 forms an inner layer of the tube 1, which, as per recommendations and in the embodiment, is connected to the internal layer 6 towards the inside. According to an alternative embodiment of the disclosure that is not shown in the drawings, the barrier layer 8 follows the adhesion-promoting layer 5 first and then the internal layer 6.

According to one embodiment, the final layer of the tube 1 towards the inside—preferably and in the embodiment the barrier layer 8—can comprise conductivity additives so as to make them electrically conductive. If, according to an alternative variant that is not shown in the drawings, the internal layer 6 forms the final layer of the tube 1 towards the inside, the internal layer 6 can comprise conductivity additives.

Expediently and in the embodiment, the outer layer 7 substantially consists of an aliphatic polyamide, preferably of Nylon 6/12. The outer layer 7 can also contain additives. According to recommendations and in the embodiment, the outer layer 7 consists of up to at least 95 wt. % of Nylon 6/12. Furthermore, an external layer 4 is provided, which preferably and in the embodiment according to the drawings is connected to the outer layer 7 towards the inside. According to a preferred embodiment and in the embodiment, the external layer 4 substantially consists of Nylon 6 and can also comprise additives, wherein the external layer 4 expediently and in the embodiment consists of up to at least 95 wt. % of Nylon 6.

According to the disclosure, an adhesion-promoting layer 5 is provided that is preferably based on polypropylene. According to recommendations and in the embodiment, the adhesion-promoting layer 5 is connected to the internal layer 4 towards the inside. Expediently and in the embodiment, the adhesion-promoting layer 5 substantially consists of polypropylene and can also contain additives. In the embodiment, the adhesion-promoting layer 5 may consist of up to at least 95 wt. % of polypropylene.

According to the disclosure, an internal layer 6 consisting of at least one thermoplastic elastomer is provided. The internal layer 6 is expediently connected to the adhesion-promoting layer 5 towards the inside. According to recommendations and in the embodiment, the thermoplastic elastomer of the internal layer 6 is based on ethylene propylene diene rubber (EPDM). Preferably and in the embodiment, the thermoplastic elastomer of the internal layer 6 is a thermoplastic vulcanizate based on EPDM and the internal layer 6 very particularly preferably substantially consists of the thermoplastic vulcanizate and can also contain additives. In this connection, it is particularly preferable for the internal layer 6 to consist of up to at least 95 wt. % of the thermoplastic elastomer or the thermoplastic vulcanizate based on EPDM.

Expediently and in the embodiment, a barrier layer 8 is connected to the internal layer 6 towards the inside. The barrier layer 8 then quasi forms an inner layer of the tube 1. The barrier layer 8 or the inner layer is preferably and in the embodiment in direct contact with the fluid temperature-control medium guided in the fluid duct 2. According to recommendations, the barrier layer 8 substantially consists of polypropylene. The barrier layer 8 can contain additional additives. Preferably and in the embodiment, the barrier layer 8 consists of up to at least 95 wt. % polypropylene.

The overall layer thickness d of the tube wall 3 of the tube 1 is expediently from 0.5 to 2.5 mm, preferably from 0.6 to 2.2 mm and particular preferably from 0.75 to 2.0 mm. According to recommendations and in the embodiment, the outer layer 7 has a greater layer thickness than the adhesion-promoting layer 5. Preferably and in the layered composite shown in the drawings, the adhesion-promoting layer 5 is the layer having the smallest layer thickness. Therefore, expediently and in the embodiment, the outer layer 7 and the external layer 4 and the internal layer 6 and the barrier layer 8 are each thicker than the adhesion-promoting layer 5. Within the context of the disclosure and in the embodiment, the barrier layer 8 also has a greater layer thickness than the internal layer 6.

What is claimed is:

1. A multi-layer motor vehicle tube for conducting at least one fluid medium, the multi-layer tube having a fluid channel and a tube wall that surrounds the fluid channel, the tube wall comprising the following layer structure from the outside to the inside:
   an outer layer made from at least one polyamide,
   an adhesion promoter layer,
   an inner layer consisting of at least 90 wt. % of a thermoplastic elastomer, and
   at least one barrier layer, the barrier layer consisting of at least 96% by weight of polypropylene; the barrier layer forming an internal layer for the multi-layer tube, such that the barrier layer adjoins the inner layer and is exposed to the at least one fluid medium,
   wherein the overall layer thickness (d) of the tube wall ranges from 0.3 to 3.0 mm.

2. The multi-layer tube according to claim 1, wherein the outer layer consists essentially of at least one polyamide selected from the group polyamide 6, polyamide 10, polyamide 11, polyamide 12, and a combination thereof.

3. The multi-layer tube according to claim 1, wherein the thermoplastic elastomer is based on ethylene-propylene-diene rubber (EPDM), butyl rubber, chlorobutyl rubber, styrene-butadiene rubber, nitrile rubber, nitrile-butadiene rubber, or a combination thereof.

4. The multi-layer tube according to claim 1, wherein the adhesion-promoting layer is based on at least one polyolefin.

5. The multi-layer tube according to claim 1, wherein the multi-layer tube further comprises an external layer that adjoins the outer layer on the outside; the external layer being based on at least one polyamide.

6. The multi-layer tube according to claim 5, wherein the layer thickness of the external layer is 5% to 20% of the total layer thickness (d) of the tube wall.

7. The multi-layer tube according to claim 6, wherein the layer thickness of the external layer is 10% to 15% of the total layer thickness (d) of the tube wall.

8. The multi-layer tube according to claim 5, wherein the polyamide of the external layer is based on at least one selected from the group of polyamide 6.12, polyamide 6.6, polyamide 6.10, and polyamide 6.16.

9. The multi-layer tube according to claim 8, wherein the at least one polyamide is based on polyamide 6.12.

10. The multi-layer tube according to claim 1, wherein the layer thickness of the barrier layer is 10% to 60% of the total layer thickness d of the tube wall.

11. The multi-layer tube according to claim 1, wherein the layer thickness of the outer layer is 10% to 40% of the total layer thickness d of the tube wall.

12. The multi-layer tube according to claim 1, wherein the layer thickness of the adhesion promoter layer is 2% to 15% of the total layer thickness d of the tube wall.

13. The multi-layer tube according to claim 1, wherein the layer thickness of the inner layer is 5% to 20% of the total layer thickness d of the tube wall.

14. The multi-layer tube according to claim 1, wherein the outer layer has a greater layer thickness than the adhesion-promoting layer.

15. The multi-layer tube according to claim 1, wherein the barrier layer has a greater layer thickness than the inner layer.

16. The multi-layer tube according to claim 1, wherein the at least one polyamide comprises an aliphatic polyamide.

17. The multi-layer tube according to claim 1, wherein the overall layer thickness (d) of the tube wall ranges 0.5 to 2.5 mm.

18. The multi-layer tube according to claim 17, wherein the overall layer thickness (d) of the tube wall ranges from 0.75 to 2.0 mm.

19. The multi-layer tube according to claim 1, wherein the at least one polyamide comprises polyamide 6, the thermoplastic elastomer is based on ethylene-propylene-diene rubber (EPDM); and the adhesion promoting layer is based on polypropylene.

20. The multi-layer tube according to claim 1, wherein the layer thickness of the outer layer is 10% to 20%; the layer thickness of the adhesion promoter layer is 7% to 15%; the layer thickness of the inner layer is 7% to 15%; and the layer thickness of the barrier layer is 15% to 50% of the total layer thickness d of the tube wall.

* * * * *